United States Patent
Nair et al.

(10) Patent No.: US 8,914,049 B2
(45) Date of Patent: Dec. 16, 2014

(54) METHOD FOR MANAGING A STATUS OF A MOBILE STATION IN A WIRELESS NETWORK

(75) Inventors: Suresh P. Nair, Whippany, NJ (US); Peretz Feder, Englewood, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 61 days.

(21) Appl. No.: 13/178,984

(22) Filed: Jul. 8, 2011

(65) Prior Publication Data

US 2012/0077464 A1 Mar. 29, 2012

Related U.S. Application Data

(60) Provisional application No. 61/387,091, filed on Sep. 28, 2010.

(51) Int. Cl.
| | |
|---|---|
| H04W 68/00 | (2009.01) |
| H04L 29/06 | (2006.01) |
| H04L 12/14 | (2006.01) |
| H04L 29/08 | (2006.01) |
| H04M 15/00 | (2006.01) |
| H04W 52/02 | (2009.01) |
| H04W 76/04 | (2009.01) |

(52) U.S. Cl.
CPC ............ *H04L 12/1403* (2013.01); *H04L 69/28* (2013.01); *H04L 67/24* (2013.01); *H04L 67/26* (2013.01); *H04M 2215/206* (2013.01); *H04W 68/00* (2013.01); *H04M 15/8033* (2013.01); *H04W 76/046* (2013.01); *H04M 15/80* (2013.01); *H04W 52/0216* (2013.01)
USPC .......................................................... 455/458

(58) Field of Classification Search
CPC ................................................ H04L 29/08576
See application file for complete search history.

(56) References Cited

U.S. PATENT DOCUMENTS

| | | | |
|---|---|---|---|
| 8,265,660 B1* | 9/2012 | Vargantwar et al. | 455/458 |
| 2005/0119008 A1* | 6/2005 | Haumont | 455/456.1 |
| 2008/0039032 A1* | 2/2008 | Haumont | 455/115.1 |
| 2008/0070603 A1* | 3/2008 | Mao | 455/466 |
| 2010/0011056 A1* | 1/2010 | Bryson et al. | 709/203 |
| 2010/0099421 A1* | 4/2010 | Patel et al. | 455/450 |
| 2011/0093601 A1* | 4/2011 | Yumoto et al. | 709/228 |
| 2011/0158209 A1* | 6/2011 | Lundsgaard et al. | 370/338 |

* cited by examiner

*Primary Examiner* — Rafael Pérez-Gutiérrez
*Assistant Examiner* — Frank Donado
(74) *Attorney, Agent, or Firm* — Harness Dickey & Pierce (57) ABSTRACT

Example embodiments relate a method for managing a status of a mobile station in a wireless network. The method includes receiving, at an accounting network element, a report message indicating a state change of the mobile station. The method may also include sending, by the accounting network element, a notice to a network serving element in response to receiving the report message, the notice message indicating the state change of the mobile station.

20 Claims, 6 Drawing Sheets

METHOD FOR MANAGING A STATUS OF A MOBILE STATION IN A WIRELESS NETWORK

PRIORITY INFORMATION

This application claims priority on U.S. Provisional Application No. 61/387,091 filed Sep. 28, 2010, the entire contents of which are hereby incorporated by reference.

BACKGROUND

1. Field of the Invention

Example embodiments are related to wireless communication.

2. Background Information

Wireless networks are rapidly evolving to increase the capabilities of mobile stations. As wireless networks evolve, the capability of mobile devices and networks are increasing to support new applications, over an internet or an intranet, that are faster and vary in signaling and response times compared to older generations of applications.

More so, a mobile station may have power saving modes, in which the mobile station goes into a dormant/idle mode if there is no data or communications to be transferred. If an application server or another user wants to communicate with a mobile station in the dormant/idle state, first the network has to page the mobile station in order to make the mobile station active. The paging operation and subsequent changing the status of the mobile station from dormant/idle to active may cause a delay from a few seconds to a few minutes. The application server handles the delay to appropriately respond to the originating application server or user, such as proceeding with a call or placing the call, etc. Additionally, signaling timeouts associated with the application need to be adjusted accordingly based on the status of the mobile station.

Currently, if an application server wants to know the radio status of the mobile station, the application server must request a status update from an authentication, authorization and accounting server. The status update procedure and establishing communication with a mobile station in dormant/idle mode may cause a time delay.

SUMMARY

One or more example embodiments are directed toward a system, apparatus or method for providing a mobile station state in a wireless communications network.

An example embodiment provides a method for managing a status of a mobile station in wireless networks. The method includes receiving, at an accounting network element, a report message indicating a state change of the mobile station. The method may further include sending, by the accounting network element, a notice to one or more network serving elements in response to receiving the report message, the notice message indicating the state change of the mobile station.

In an example embodiment, the state change of the mobile station is from an idle state to an active state. In another example embodiment, the state change of the mobile station is from an active state to an idle state.

In another example embodiment, the state change of the mobile station may be from an active or idle status to an unknown status of the mobile. The unknown state of the mobile station may indicate no communication is possible with the mobile station.

In further example embodiments, the accounting network element is an authentication, authorization and accounting server and the network serving elements are application servers and/or presence servers.

Another example embodiment provides a method for managing a status of a mobile station in wireless networks. The method includes receiving, at an accounting network element, a report message indicating a state change of the mobile station. The method may further include sending, by the accounting network element, a notice message to one or more network serving elements without receiving a mobile station state query from the network serving element, the notice message indicating the state change of the mobile station.

A further example embodiment provides a method for managing a status of a mobile station in wireless networks. The method may include receiving, at a network serving element, a notice message indicating a state change of a mobile station without sending a mobile station state query. The method may further include updating at least one application signaling timer, by the network serving element, in response to the received notice message, the at least one application signaling timer indicating a time required for establishing communication with the mobile station.

In an additional example embodiment, the network serving element may trigger paging of the mobile station and update the signaling and/or the application timer to account for the paging procedure. Also, the updated application timer may be a timer for session initiation protocol messages.

In further example embodiments, if the state change of the mobile station is from an active state or an idle state or to an unknown state, an alternative action may be initiated by the network serving element.

In another example embodiment, the network serving element uses the mobile station status information to optimize its resources and behavior to appropriately match the characteristics of the application. The network serving element may be supporting one or more of applications such as voice, data, video, broadcast, gaming, music, streaming audio/video, chatting, texting, instant messaging, internet radio, location based services, etc. The optimization actions may include signaling response management, data storage buffer management and transmission bandwidth management, etc.

In another example embodiment, the network serving element initiates at least one action for resource management and/or performance management based on an application associated with the received notice message.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Detailed illustrative embodiments are disclosed herein. However, specific structural and functional details disclosed herein are merely representative for purposes of describing example embodiments. An embodiment may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Exemplary embodiments are discussed herein as being implemented in a suitable computing environment. Although not required, exemplary embodiments will be described in the general context of computer-executable instructions, such as sections, program modules or functional processes, being executed by one or more computer processors or CPUs. Generally, sections, program modules or functional processes include routines, programs, objects, components, data structures, etc. that performs particular tasks or implement particular abstract data types. The sections, program modules and functional processes discussed herein may be implemented using existing hardware in existing communication networks. For example, sections, program modules and functional processes discussed herein may be implemented using existing hardware at existing network elements, servers or control nodes. Such existing hardware may include one or more digital signal processors (DSPs), application-specific-integrated-circuits, field programmable gate arrays (FPGAs) computers or the like. More so, the network servers may be part of a network employing internet protocol or may be node in a cloud computing environment.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile station (MS)" may be considered synonymous to, and may hereafter be occasionally referred to, as a mobile, mobile unit, mobile user, mobile terminal, access terminal (AT), subscriber, user, user equipment (UE), remote station, receiver, etc., and may describe a remote user of wireless resources in a wireless communication network. The term "base station (BS)" may be considered synonymous to and/or referred to as a base transceiver station (BTS), NodeB, access node (AN), eNodeB, etc. and may describe equipment that provides data and/or voice connectivity between a network and one or more users. The term "mobile station state" may be considered synonymous to and/or referred to as "mobile station status"

Figure 1:
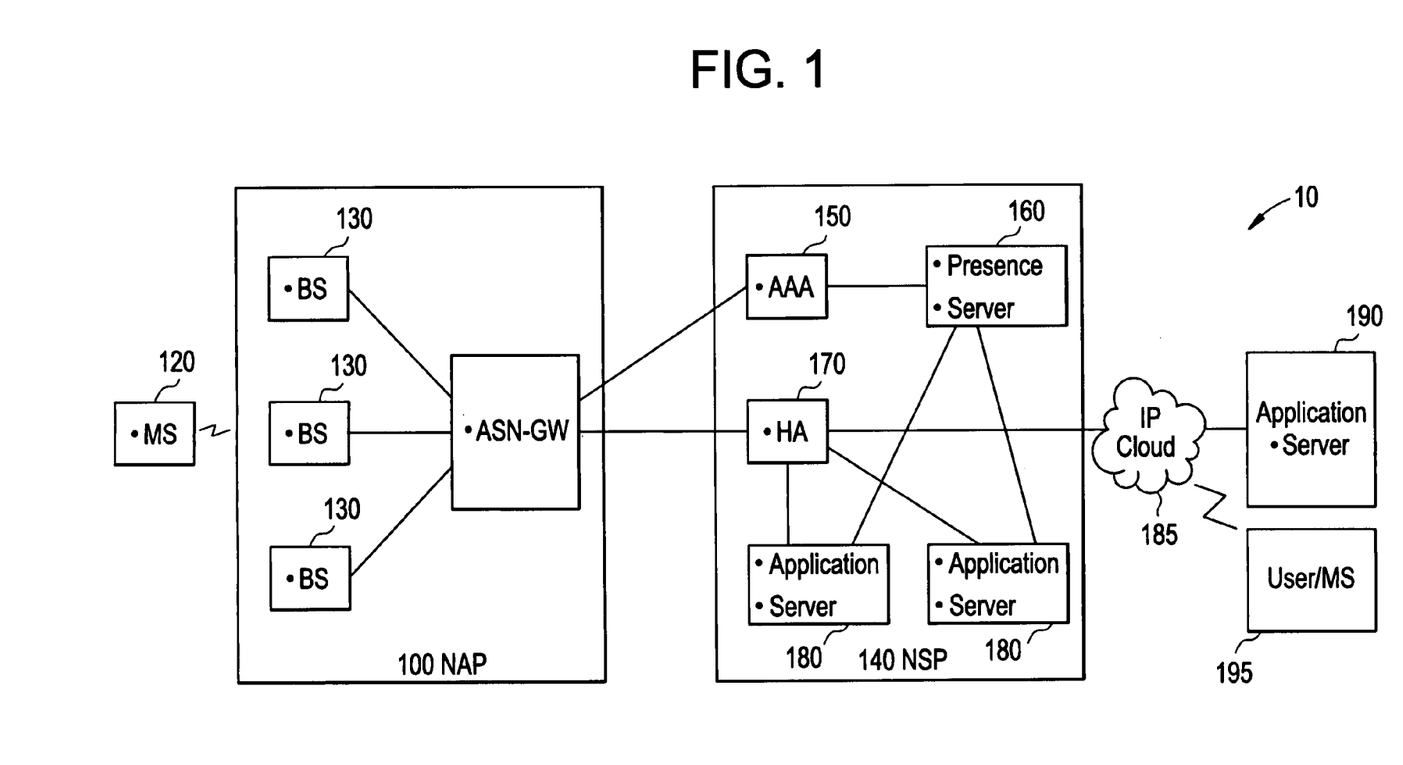
FIG. 1 illustrates a block diagram of an example communication network architecture for implementing a method for managing a status of a mobile station in wireless networks according to an example embodiment.

FIG. 1 illustrates an example embodiment of a first network architecture. An example embodiment as illustrated in FIG. 1 may be directed towards a network 10 including a network access provider 100 (NAP). The network access provider 100 may include at least one access service network-gateway 110 (ASN-GW). More so, in the example embodiments at least one mobile station 120 (MS) may be in communication with the network access provider 100 via at least one base station 130 and the at least one access service network-gateway 110.

The network 10 may also include a network service provider 140 (NSP). The network service provider 140 may include an authenticating, authorization and accounting server 150 (AAA), a presence server 160, a home agent 170 (HA) and at least one application server 180.

The network service provider 140 may be communicably coupled to the network access provider 100 via the at least one access service network-gateway 110. The at least one access service network-gateway 110 may be communicably coupled to at least one of the home agent 170 and the authentication, authorization and accounting server 150. Furthermore, in example embodiments the network service provider 140 may also be coupled to an application sever 190 or a user connected through another mobile station 195 via an IP cloud 185.

Figure 2:
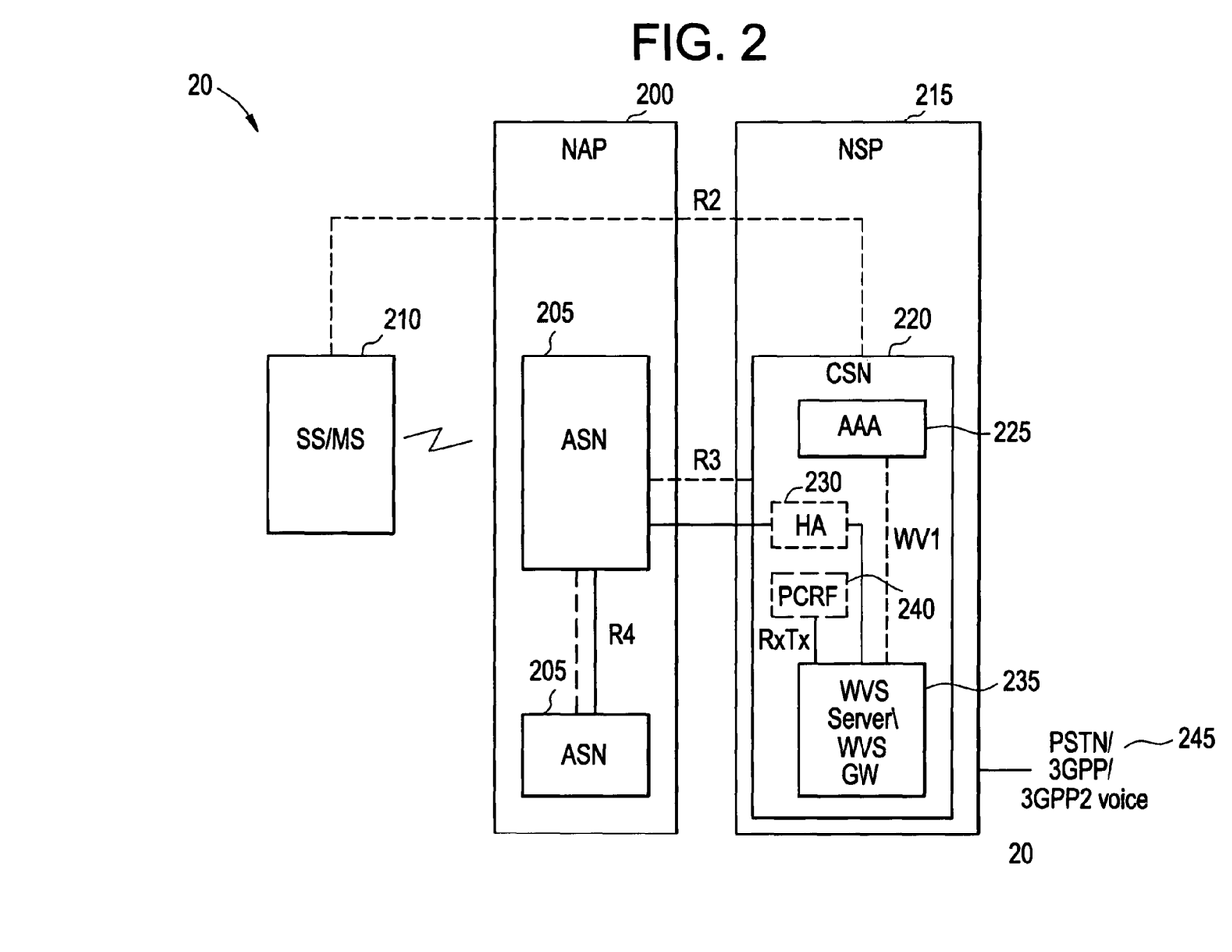
FIG. 2 illustrates a block diagram of an example communication network architecture for implementing a method for managing a status of a mobile station in wireless networks according to another example embodiment.

FIG. 2 illustrates an example of a second network architecture. A further example embodiment, as illustrated in FIG. 2, may be directed towards a network 20. The network 20 may include a network access provider 200 (NAP). The network access provider may include at least one access service network 205 (ASN). The at least one access service network 205 may be communicatively coupled to a mobile station 210 (MS) and a network service provider 215 (NSP) via a connectivity service network 220 (CSN).

The network service provider 215 in FIG. 2 includes the connectivity service network 220. The connectivity service network 220 may include authenticating, authorization and accounting server 225 (AAA), home agent 230 (HA), a WiMAX voice server 235 (WVS) and a policy charging and resource function 240 (PCRF).

The authenticating, authorization and accounting server 225, home agent 230, and the policy charging and resource function 240 may be communicably coupled to the WiMAX voice server 235. Furthermore, the network service provider 215 may be in communication with a public switched telephone network 245 capable of processing at least voice and video data.

Figure 3:
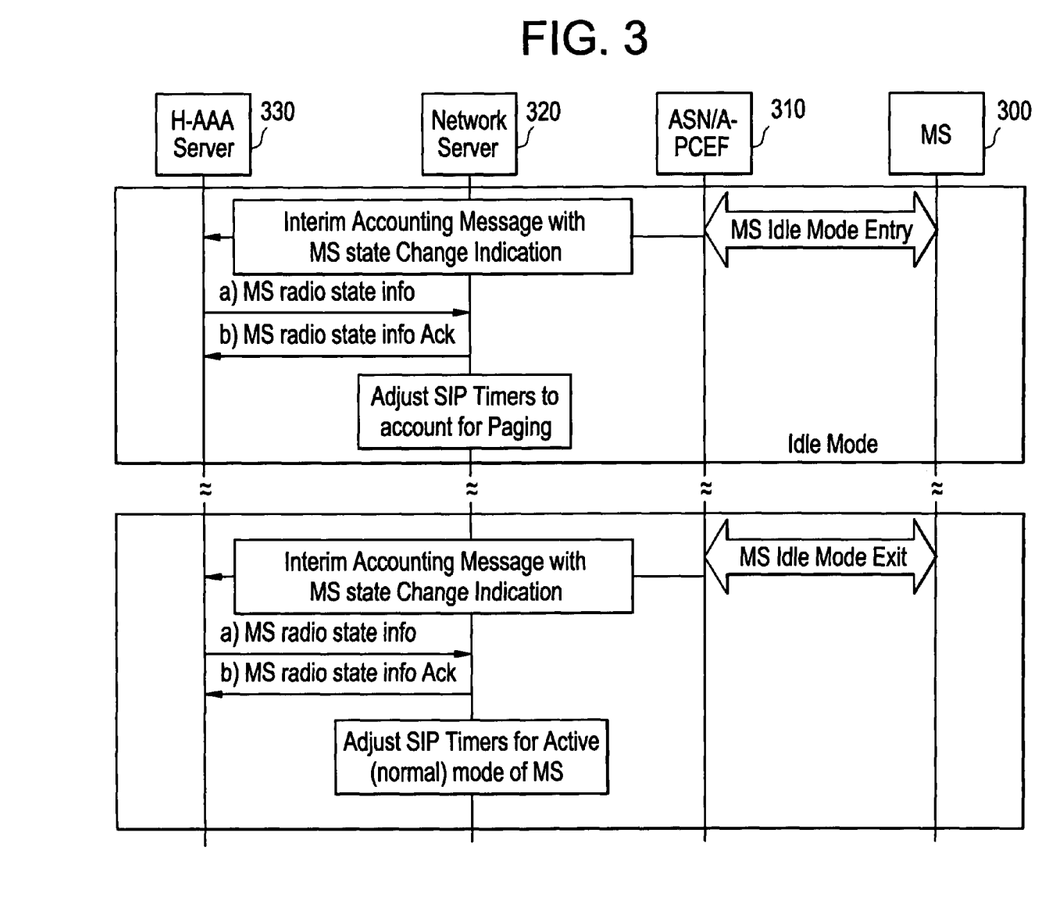
FIG. 3 is a flow diagram illustrating a method for managing a status of a mobile station in wireless networks according to an example embodiment.

FIG. 3 illustrates an example embodiment to make core network entities, such as an authenticating, authorization and accounting server 330 (H-AAA Server) and/or a network server 320 (Network Server), aware of a radio state of a mobile station 300 (MS).

In the following example embodiments, the authentication, authorization and accounting servers as discussed below could be the authenticating, authorization and accounting servers 150 or 225 of FIG. 1 or 2, respectively. Additionally, the network server 320 as discussed below could be the application server 180 of FIG. 1 or the WiMAX voice server 235 of FIG. 2.

If the mobile station 300 is in an idle state, there is no data or communications sent to and/or from the mobile station 300. If the mobile station 300 is in an idle state and there is another application server or user that wants to communicate data with the mobile station 300, first the network server 320 should notify the access service network 310 to page the mobile station 300 to change the radio state of the mobile station 300 from an idle state to an active state. In other words, if an application server, such as the network server 320 wants to communicate with the mobile station 300, it is required or desired that mobile station 300 be in an active state.

Accordingly, there is a paging delay created when establishing communication between network server 320 and the mobile station 300 to change the radio state of the mobile station 300 from idle to active. However in conventional networks, servers such as the network server 320 are not sensitive to the paging delay, and the servers in conventional networks behave as if the radio state of the mobile station is always in active mode. If servers do not account for the radio state of the mobile station, sub-optimal and/or delayed communication may occur between the mobile station and the network.

To improve or optimize signaling timers, the authentication, authorization and accounting server 330 and/or network server 320 require or desire to know the state of the mobile station 300 to adjust signaling timers. Furthermore, in example embodiments the signaling timers may be session initiation protocol (SIP) timers and/or application signaling timers. More so, the network server 320 may initialize optimization actions for resource management and performance management within the network. More specifically, the resource and performance management may be actions such as data storage buffer management and/or transmission bandwidth management based on characteristics of an application associated with the notice message.

FIG. 3 illustrates an example embodiment of the mobile station 300 changing from idle state to an active state, and changing from an active state to an idle state. If the mobile station 300 changes radio states, the mobile station 300 should communicate the radio state change information to the authentication, authorization and accounting server 330 via the access service network 310. Accordingly, if the mobile station 300 changes radio states, the authentication, authorization and accounting server 330 is aware of the radio state change of the mobile station 300.

Upon the authentication, authorization and accounting server 330 receiving the radio state change of the mobile station 300, the authentication, authorization and accounting server 330 pushes, pro-actively sends or automatically sends the radio state change information of the mobile station 300 to network server 320. When receiving the radio state change of the mobile station 300 from the authentication, authorization and accounting server 330, the network server 320 is able to store the mobile station status information and update signaling timers to accommodate for paging the mobile station 300. Thus, communication between the network server 320 and the mobile station 300 may be improved or optimized using the updated signaling timers.

More specifically, if the radio state of the mobile station 300 changes from an idle state to an active state, the signaling timers may be shortened by the network server 320. If the radio state of the mobile station 300 changes from an active to an idle state, the signaling timers may be extended by the network server 320 to account for paging and mobile station reactivation. Furthermore, the updated signaling timers may be used for call termination or communicating applications to mobile station 300. For example, the signaling timers may be extended or shortened based on design parameters established by empirical data from testing performed before the system is implemented or characteristics of the network architecture. In example embodiments, the signaling timers may be extended by a fixed increment or decremented by a fixed decrement based on parameters established by empirical data.

Therefore, a limited, reduced or no load relating to the radio state information of the mobile station 300 is created in the authentication, authorization and accounting server 330 by pushing, pro-actively sending or automatically sending the radio state change information of the mobile station 300 to the network server 320. Additionally, in other example embodiments, the authentication, authorization and accounting server 330 may be an application server, a presence server or both. In an example embodiment the authentication, authorization and accounting server 330 and the presence server may be different elements, and the radio state of mobile station 300 may be pro-actively sent or pushed from the authentication, authorization and accounting server 330 to the presence server.

Figure 4:
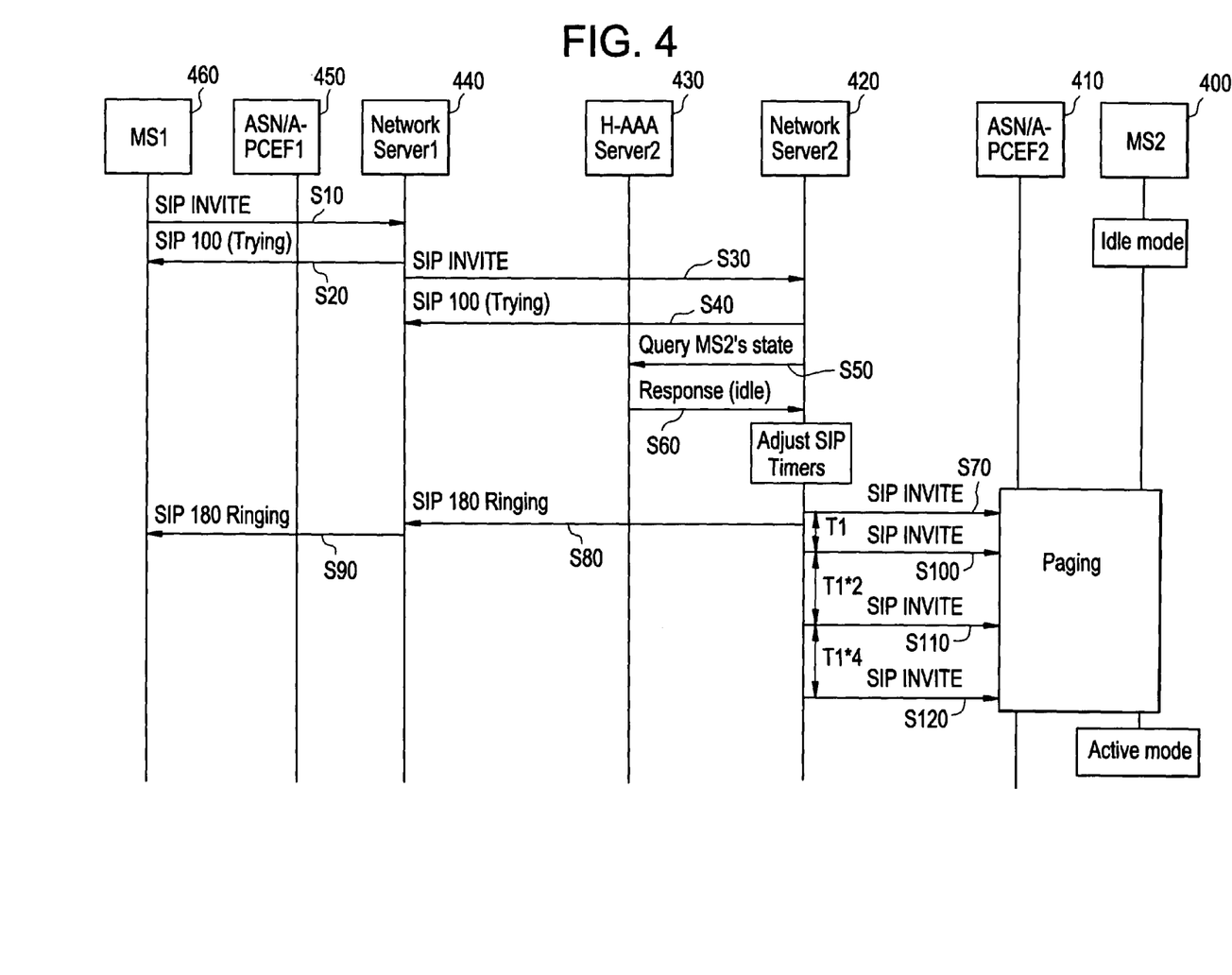
FIG. 4 is a flow diagram illustrating a method for managing a status of a mobile station in wireless networks according to conventional art.

FIG. 4 illustrates a conventional method for a second network server 420 (Network Server 2) to obtain a radio status of a second mobile station 400 (MS2). In the conventional art, if a first mobile station 460 (MS1) wants to communicate with the second mobile station 400 (MS2), in S10 the first mobile station 460 (MS1) sends a session initiation protocol message (SIP) invite to a first network server 440 (Network Server 1). In S20, the first network server 440 sends a SIP message to mobile station 460 indicating reception of the SIP invite message.

In S30, the first network server 440 forwards the SIP invite message to the second network server 420. In response to receiving the SIP invite message in S30, in S40 the second network server 420 may send a reply SIP message to the first network server 440. Then in S50, because the second network server 420 is unaware of the radio state of the mobile station 400 it is required that the second network server 420 sends a query message to a second authentication, authorization and accounting server 430 (H-AAA2) requesting information regarding the radio state of mobile station 400. In S60, the second authentication, authorization and accounting server 430 in response to receiving the query message from second network server 420 sends a response message indicating the radio state of mobile station 400. Then, based on the response message sent from the second authentication, authorization and accounting server 430, the network server 420 adjusts the signaling timers based on the radio state of mobile station 400. Accordingly, there may be a delay in communications between the second network server 420 and the mobile station 400 that requires adjustments to the signaling timers.

In steps S70-S120, the second network server 420 may communicate an SIP invite message with the adjusted signaling timers via an access service network gateway 410. In response to receiving the SIP invite message, the radio state of second mobile station 400 is changed via a paging mechanism from active to idle.

As discussed above with relation to FIG. 3, FIG. 5 describes an example embodiment where a mobile station 500 (MS2) changes radio states, and the mobile station 500 informs a second authentication, authorization and accounting server 530 (H-AAA Server2) of the changed radio state. Also as discussed above with respect to FIG. 3, the second authentication, authorization and accounting server 530 that receives the radio state change of mobile station 500 pushes, pro-actively sends or automatically sends the radio state change information of mobile station 500 to a second network server 520 (Network Server 2).

Figure 5:
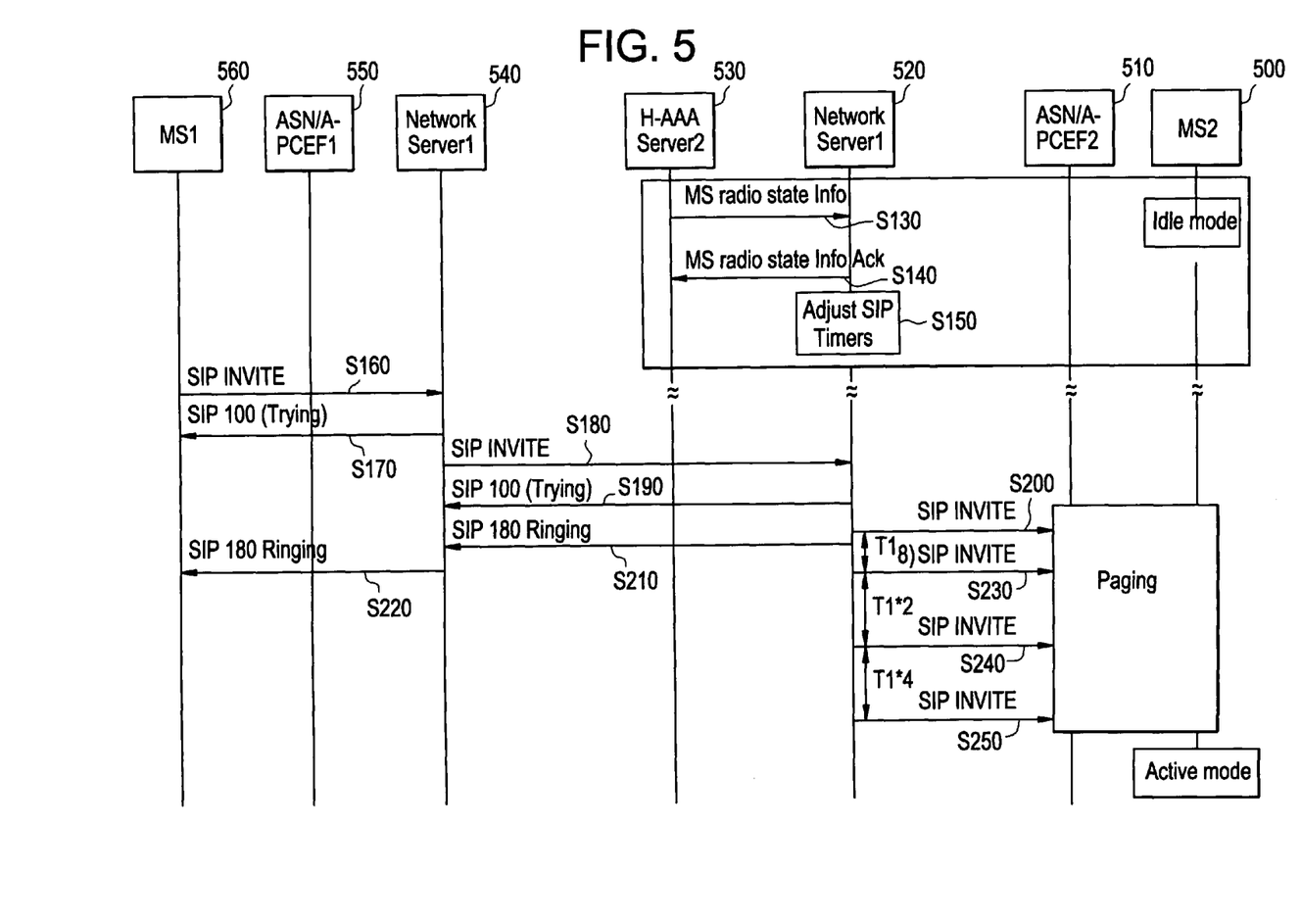
FIG. 5 is a flow diagram illustrating a method for managing a status of a mobile station in wireless networks according to an example embodiment.

In S130, upon receiving the radio state change of mobile station 500 from the second authentication, authorization and accounting server 530, in S140 the second network server 520 is able to update the signaling timers to account for the paging of the second mobile station 500 before accepting a call or application request for the second mobile station 500. Additionally, in S140 the second network server 520 may send a mobile station radio state change acknowledgement message to the second authentication, authorization and accounting server 530.

In S160 a first mobile station 560 (MS1) sends a session initiation protocol message (SIP) invite to a first network server 540 (Network Server 1). In S170, the first network server 540 sends a SIP message to the first mobile station 560 indicating reception of the SIP invite message.

In S180, the first network server 540 forwards the SIP invite message to the second network server 520. In response to receiving the SIP invite message in S180, in S190 the second network server 520 may send a reply SIP message to the first network server 540.

In S200 of FIG. 5, the second network server 520 has already adjusted the signaling timers based on the radio state of second mobile station 500. Accordingly, communications between second network server 520 and the second mobile station 500 are optimized, and a delay is nulled, minimized or limited for the second network server 520 to change the signaling timers based on the radio state of mobile station 500.

In FIG. 5, in S200 and S230-S250 the second network server 520 may transmit SIP invite messages with the adjusted signaling timers via access service network 510. In response to receiving the SIP invite message(s) the radio state of the second mobile station 500 is changed via paging mechanism from idle to active. In S210 the second network server 520 may transit an SIP ringing message to the first network server 540. In S220, responding to the first network server 540 receiving the transmitted SIP ringing message, the first network server 540 may transmit the SIP ringing message to the first mobile station 560.

Figure 6:
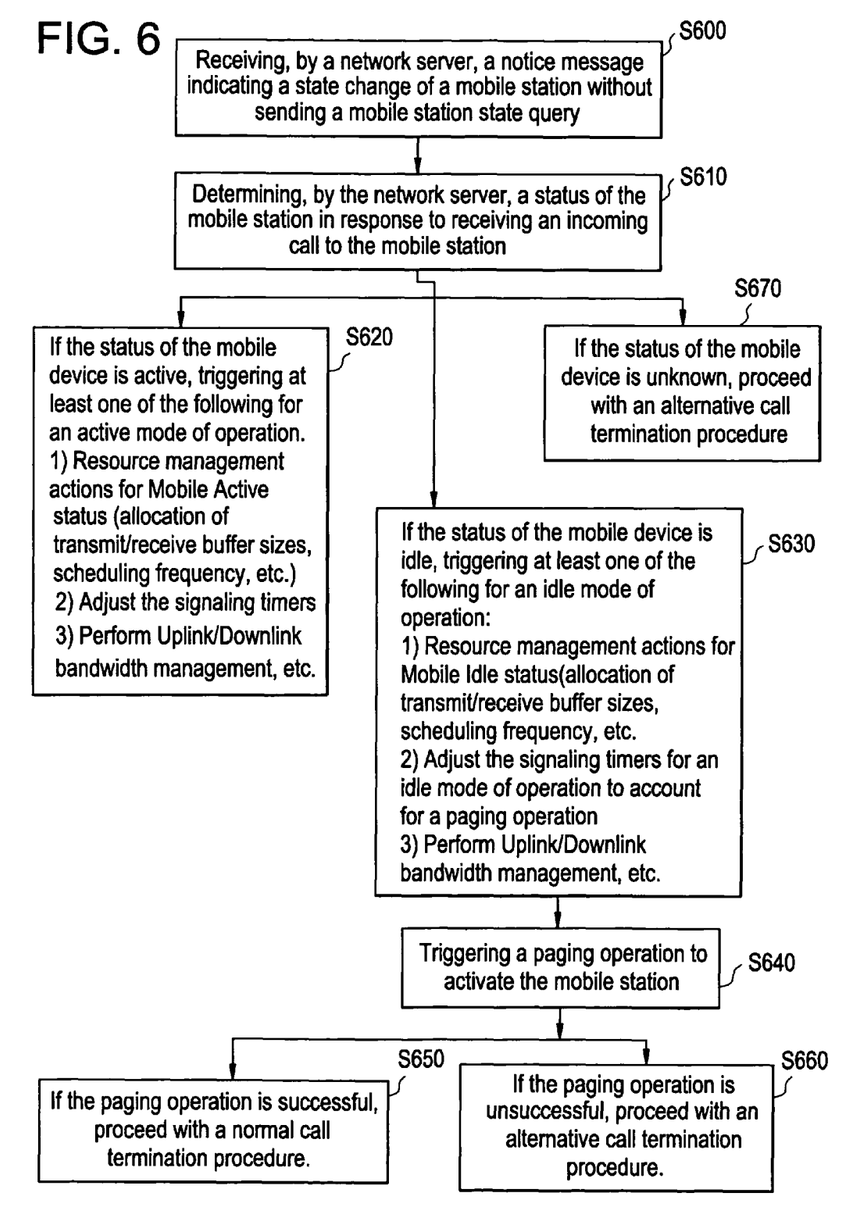
FIG. 6 is a flow diagram illustrating a method of a call processing flow at a network server using the mobile station radio status information, updating at least one signaling timer according to an example embodiment.

FIG. 6 is a flow diagram illustrating optimized behavior of a network server storing mobile station radio status and updating at least one signaling timer. More so, the network server as discussed below could be the application server 180 of FIG. 1 or the WiMAX voice server 235 of FIG. 2.

In S600, the network server receives a notice message indicating a state change of a mobile station without sending a mobile station state query. The network server stores this mobile station radio status. In S610, in response to receiving an incoming call towards the mobile station, the network server determines the state of the mobile station.

In S620 if the network server determines in S610 that the status of the mobile station is active, the network server may adjust the signaling timers for an active mode of operation for the mobile station as discussed above in reference to FIG. 3. Accordingly, in S620 the network server may trigger at least one of the following for an active mode of operation: resource management actions such as allocation of buffer sizes, adjusting signaling timers and uplink/downlink bandwidth management.

In S630 if the network server determines in S610 that the status of the mobile station is idle, the network server may adjust the signaling timers for an idle mode of operation for the mobile station to account for a paging operation as discussed above in reference to FIG. 3. Accordingly, in S630 the network server may trigger at least one of the following for an idle mode of operation: resource management actions such as allocation of buffer sizes, adjusting signaling timers and uplink/downlink bandwidth management.

In S640, the network server may trigger the paging operation to activate the mobile station. In S650, if the paging operation in S640 is successful the network server may proceed with a normal call termination procedure.

In S660 if the paging operation in S640 is unsuccessful, the network server may proceed with an alternative procedure. For example, the alternative call procedure could be a call termination procedure such as initiating call forwarding to an alternative telephone number, call forwarding to a voice message system to leave a message for a subscriber or signaling, notifying or announcing to the call originator that the mobile station with the idle status is unreachable, etc.

In S670 if the network server determines in S610 that the status of the mobile station is unknown, the network server may proceed with an alternative call procedure as discussed above regarding S660.

Also, in further example embodiments, communications between peer mobile stations may use the same authentication, authorization and accounting server, access service node and/or network server. Accordingly, in embodiments that use the same network server communications between a first mobile station and a second mobile station can be further optimized.

While embodiments were described above using two network servers, two access service networks and two authentication, authorization and accounting servers in a network, the embodiments are not limited to two network servers, access service nodes and authentication, authorization, and accounting servers. Instead, only one network server, access service node and authentication, authorization and accounting server may be included in the network. Alternatively, more than two network servers, access service nodes and authentication, authorization and accounting servers may be included in the network.

Furthermore, while example embodiments were described with reference to network architecture as illustrated in FIGS.

1 and 2, example embodiments are not limited to the network architecture as illustrated in FIGS. 1 and 2.

Also, while embodiments were described above using voice data transfers, the embodiments are applicable to and/or may include applications such as voice, data, video, broadcast, gaming, music, streaming audio/video, chatting, texting, instant messaging, internet radio, Location based services, etc. using any radio access technologies such as 2G, CDMA, WCDMA, EVDO, WiMAX, WiFi, LTE etc.

Also, while embodiments described are describing optimization of signaling timers and alternate actions, further optimization actions by the network server for resource management and performance management may include data storage buffer management and transmission bandwidth management etc in accordance with the characteristics of the application being supported.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A method for managing a status of a mobile station in a wireless network, the method comprising:
   receiving, at a network serving element, a notice message from an accounting network element, the notice message indicating a state change of the mobile station, the notice message not being received in response to a query for the status of the mobile station; and
   updating, at the network serving element, a signaling timer stored at the network serving element, when the state change indicated in the notice message received from the accounting network element indicates that the status of the mobile station has changed, the signaling timer indicating a period during which the network serving element expects to receive a response from the mobile station to a subsequent paging request and the updating including decreasing the signaling timer stored at the network serving element when the status of the mobile station, as indicated in the notice message received from the accounting network element, is from an idle state to an active state.

2. The method of claim 1, wherein the state change of the mobile station is from an idle state to an active state.

3. The method of claim 1, wherein the state change of the mobile station is from an active state to an idle state.

4. The method of claim 1, wherein the state change of the mobile station is from at least one of an active state and an idle state to an unknown state, the unknown state of the notice message indicating to the network serving element to initiate a call termination action.

5. The method of claim 1, wherein the accounting network element is an authentication, authorization and accounting server, and the network serving element is at least one of an application server and a presence server.

6. A method for managing a status of a mobile station in a wireless network, the method comprising:
   receiving, at a network serving element, a notice message from an accounting network element, the notice message sent to the network serving element without the network serving element sending query to the accounting network element for the status of the mobile station, the notice message indicating a state change of the mobile station; and
   updating, at the network serving element, a signaling timer stored at the network serving element, if the notice message received from the accounting network element indicates that the status of the mobile station has changed, the signaling timer indicating a period during which the network serving element expects to receive a response from the mobile station to a subsequent paging request and the updating including decreasing the signaling timer stored at the network serving element if the status of the mobile station, as indicated in the notice message received from the accounting network element, is from an idle state to an active state.

7. The method of claim 6, wherein the state change of the mobile station is from an idle state to an active state.

8. The method of claim 6, wherein the state change of the mobile station is from an active state to an idle state.

9. The method of claim 6, wherein the state change of the mobile station is from at least one of an active state and an idle state to an unknown state, and the unknown state of the notice message indicates to the network serving element to initiate a call termination action.

10. The method of claim 6, wherein the accounting network element is an authentication, authorization and accounting server, and the network serving element is at least one of an application server and a presence server.

11. The method of claim 6, wherein the network serving element is configured to support at least one of voice, data, video, broadcast, gaming, music, streaming audio/video, chatting, texting, instant messaging, internet radio and location based services.

12. An apparatus for managing a status of a mobile station in a wireless network, the apparatus comprising:
   a processor and an associated memory, the processor configured to,
      receive, at a network serving element, a notice message from an accounting network element, the notice message indicating a state change of the mobile station, the notice message not being received in response to a query for the status of the mobile station, and
      update a signaling timer stored at the network serving element, when the state change indicated in the notice message received from the accounting network element indicates that the status of the mobile station has changed, the signaling timer indicating a period during which the network serving element expects to receive a response from the mobile station to a subsequent paging request and the updating including decreasing the signaling timer stored at the network serving element when the status of the mobile station, as indicated in the notice message received from the accounting network element, is from an idle state to an active state.

13. The apparatus of claim 12, wherein the state change of the mobile station is from an idle state to an active state.

14. The apparatus of claim 12, wherein the state change of the mobile station is from an active state to an idle state.

15. The apparatus of claim 12, wherein the state change of the mobile station is from at least one of an active state and an idle state to an unknown state, the unknown state of the notice message indicating to the network serving element to initiate a call termination action.

16. The apparatus of claim 12, wherein the processor is an authentication, authorization and accounting server, and the network serving element is at least one of an application server and a presence server.

17. An apparatus for managing a status of a mobile station in a wireless network, the apparatus comprising:
   a processor and an associated memory, the processor configured to, receive, at a network serving element, a notice message from an accounting network element, the notice message sent to the network serving element without the network serving element sending a query to the accounting network element for the status of the mobile station, the notice message indicating a state change of the mobile station, and update a signaling timer stored at the network serving element when the state change indicated in the notice message received from the accounting network element indicates that the status of the mobile station has changed, the signaling timer indicating a period during which the network serving element expects to receive a response from the mobile station to a subsequent paging request and the updating including decreasing the signaling timer stored at the network serving element when the status of the mobile station, as indicated in the notice message received from the accounting network element, is from an idle state to an active state.

18. The apparatus of claim 17, wherein the state change of the mobile station is from an idle state to an active state.

19. The apparatus of claim 17, wherein the state change of the mobile station is from at least one of an active state and an idle state to an unknown state, and the unknown state of the notice message indicates to the network serving element to initiate a call termination action.

20. The apparatus of claim 17, wherein the processor is an authentication, authorization and accounting server, and the network serving element is at least one of an application server and a presence server.

* * * * *